Dec. 6, 1927.  1,652,152
H. W. BIBLE
MEANS FOR BUILDING OR COMPOSING DESIGNS OF FLAGS OR OTHER EMBLEMS
Filed Oct. 17, 1927
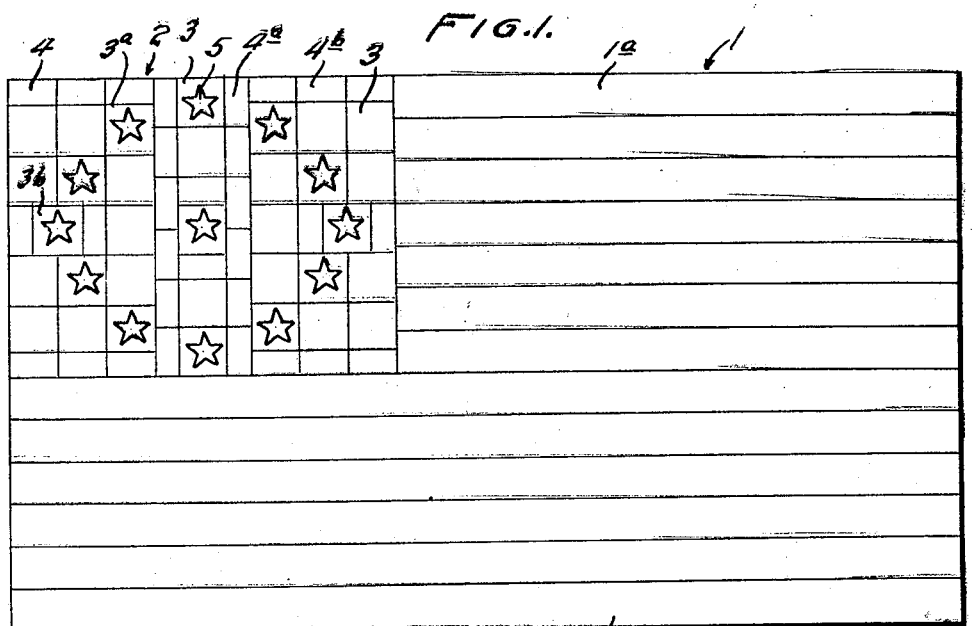
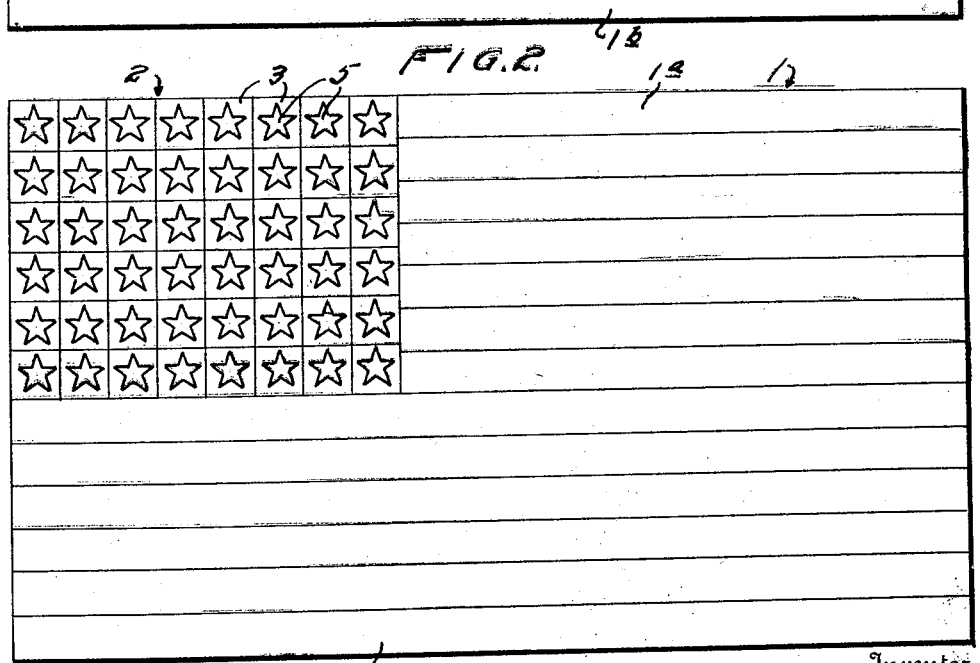
Inventor
HOWARD W. BIBLE
By Semmes & Semmes
Attorney Patented Dec. 6, 1927.

1,652,152

UNITED STATES PATENT OFFICE.

HOWARD W. BIBLE, OF ATLANTIC CITY, NEW JERSEY.

MEANS FOR BUILDING OR COMPOSING DESIGNS OF FLAGS OR OTHER EMBLEMS.

Application filed October 17, 1927, Serial No. 226,809, and in Great Britain June 10, 1926.

This invention relates to toys and more particularly has reference to a set of blocks.

Blocks have been provided heretofore which may be assembled to form flags, and in some instances the same set of blocks have been capable of forming several different flags. None of the blocks heretofore provided, however, have been capable of forming all of the national emblems of the United States.

An object of this invention is to provide an educational toy.

Another object of this invention is to provide a set of blocks adapted to be assembled to form a flag.

Yet another object of this invention is to provide a set of blocks that are capable of forming the national emblem of the United States at any time in the history of the country.

To accomplish the above and other important objects as will appear herein, my invention in general comprises a set of blocks having indicia on their faces, the blocks being of various sizes and susceptible of different arrangements.

To insure a more complete comprehension of my invention, reference is made to the accompanying drawings, in which similar numerals indicate the same parts, it being distinctly understood, however, that various modifications may be made in the embodiment therein set forth, without exceeding the scope of my invention.

Figure 1 is a view in perspective of the blocks assembled to form an early American flag.

Fig. 2 is a view in perspective of blocks assembled to form the American flag of today.

Referring more particularly to Figure 1, there are shown a series of rectangular parallelepipeds 1. It will be observed that these blocks are of two different lengths, 1ª being a block for positioning opposite the canton or field 2 of the flag. Blocks 1ᵇ are positioned in the lower portion of the flag and extend the length of the flag. These blocks are adapted to form stripes, and may be colored, if desired. In blocks for forming the American flag the blocks 1 should be alternately red and white. While I have shown herein blocks assembled to represent the American flag, it is of course understood that they may be employed for the purpose of forming other standards. The blocks 1 may be colored red on two faces and white on the other faces, may be colored the same throughout, or may have different colors on each of their rectangular faces.

The blocks 1 represent the bars of the flag, and the canton is formed by blocks 3 and 4. It will be observed that the blocks 4 are half the size of the blocks 3, so that when two of the blocks 4 are positioned adjacent each other they occupy the same space as one of the blocks 3. It is preferable that the blocks 3 be cubes, and the blocks 4 half cubes. In the case of the American flag, each block 3 may be colored blue, with a white star 5 appearing on one face. The number of faces on which stars or other indicia appear may be varied, but at least one face of the cube should be plain blue. The blocks 4 may be colored blue.

In Figure 1 there is shown a set up of the blocks by which an early American flag is formed. Certain of the blocks 3 may be so placed that the blank faces are on the visible side. The half cubes and whole cubes that are used as a blue field for the stars are so arranged as to almost completely fill the space left for the canton, and the blocks 3 with the stars exposed are so set in the field as to depict the circular arrangement of the stars, which characterizes the early flag.

In Fig. 2, the blocks are arranged to form the present American flag with forty-eight stars in the canton. It will be observed that the blocks 4 are not required in this flag.

From the foregoing the operation and manipulation of the blocks are obvious. To form the American flag the blocks 1ª and 1ᵇ are arranged in close contact with each other, the blocks 1ª at the top and the blocks 1ᵇ below. The blocks should be positioned so as to alternate in red and white to form the stripes of the American flag. The ends of all of the blocks are aligned on the right so that a space remains in the upper left corner for the formation of the canton. The stripes of the flag will remain the same regardless of the particular American flag desired to be formed, except in the case of the Star Spangled Banner of 1814 which has fifteen stripes.

If it is desired to form the present American flag, forty-eight of the cubes 3 are positioned in the canton space, with the stars on the blocks exposed. All of the stars will be aligned both vertically and horizontally.

As shown in Figure 1, an early American flag may be formed with twelve stars arranged in a circle and a single star in the center. It will be observed that the blocks 4 may be positioned in the canton either with their greatest thickness in a vertical plane as shown by 4$^a$, or their greatest thickness may be in a horizontal plane as shown by 4$^b$. In this way any one of the cubes 3 as cube 3$^a$, for instance, may be positioned above or below the general horizontal alignment of the other cubes, or they may be in different alignment vertically as shown by cube 3$^b$. The blocks are not restricted to the formation of only the two flags shown. The canton may be formed to depict the American flag at any time in its evolution. For instance, when the Union was composed of forty-six States, the second and fifth horizontal lines of the present flag contained only seven stars. These seven stars were staggered with respect to the adjacent lines. My invention contemplates such an arrangement of the canton which may be effected by withdrawing one star each from the second and fifth lines. Assuming that the left-most stars in these lines are withdrawn, the remaining stars in that line would then be moved to the left until they were in a staggered relationship to the lines containing eight stars. Half cubes 4, having their plain blue faces exposed, would then be inserted at each end of the seven star lines to completely fill the field.

It will thus be seen that an American flag containing any number of stars may be formed. Should two stars be withdrawn from any line their places may be filled by two cubes 3 with their plain faces exposed, but in the event of the withdrawal of only one star, such a vacancy may be filled by two of the half cubes 4.

Inasmuch as the blocks 3 are cubes and have at least one plain blue face and one face with a star, each block is adapted to form either a part of the blue field of the canton or one of the stars. Thus, for example, forty-eight blocks 3 and a given number of half-cubes 4 are sufficient to form any of the national flags of this country.

It will be appreciated that my invention provides a toy or game that is instructive as well as amusing. By using these blocks a person acquires a familiarity with the flag of the United States at any period in the history of the country. Not only does one know the number of States in the Union, and hence the number of stars in the flag, at any time, but the particular arrangement of the stars within the canton also becomes familiar. By means of the various blocks employed an exact reproduction of the American flag at any time may be secured, regardless of the period which is under consideration. It will be readily seen that my invention is of particular utility in schools and for students of history.

Although I have set forth in the drawings and have described herein a set of blocks adapted for the formation of the American flag, I wish it to be distinctly understood that my invention is not limited by the flag to be constructed, for similar blocks may be provided that are adapted to form the flag of any nation. Nor are the colors or particular shapes of the blocks herein described to constitute a limitation. The appended claims alone are to be taken as definitive of my invention.

I claim as my invention:

1. An educational toy comprising red and white parallelepipeds, blue cubes having on only one face a white star, and blue half cubes.

2. An educational toy comprising red and white parallelepipeds, cubes having at least one plain blue face, a white star upon another face of each cube, and half-cubes having at least one blue face.

3. An educational toy adapted to form the canton of the American flag comprising cubes, each cube having at least one plain blue face and at least one face with a star thereon, and half-cubes having at least one plain blue face.

4. An educational toy adapted to form the canton of the American flag comprising a series of blocks, means by which each block is adapted to form either a portion of the blue field or a star, and other blocks half the size of the first-mentioned blocks having at least one blue face.

HOWARD W. BIBLE.